(12) United States Patent
Lahiri et al.

(10) Patent No.: US 7,327,538 B2
(45) Date of Patent: Feb. 5, 2008

(54) LEAD OVERLAY SENSOR WITH IMPROVED CURRENT PATH

(75) Inventors: Ashok Lahiri, Cupertino, CA (US); Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/479,318

(22) Filed: Jun. 29, 2006

(65) Prior Publication Data

US 2006/0245115 A1 Nov. 2, 2006

Related U.S. Application Data

(63) Continuation of application No. 10/303,114, filed on Nov. 22, 2002.

(51) Int. Cl.
*G11B 5/39* (2006.01)
(52) U.S. Cl. .................................................. 360/320
(58) Field of Classification Search ...................... None
See application file for complete search history.

(56) References Cited

U.S. PATENT DOCUMENTS

| 5,438,470 A | 8/1995 | Ravipati et al. |
| 5,641,557 A | 6/1997 | Ishiwata |
| 6,262,869 B1 | 7/2001 | Lin et al. |
| 6,765,768 B2* | 7/2004 | Saito ........................ 360/319 |
| 6,910,259 B1* | 6/2005 | Lin et al. ................ 29/603.08 |
| 2002/0167765 A1 | 11/2002 | Sato |
| 2004/0037014 A1* | 2/2004 | Mauri et al. ............... 360/322 |

OTHER PUBLICATIONS

Research Disclosure, Sep. 2001, No. 449119, "Zero net magnetization for lead overlap region for lead overlay head".
Research Disclosure, Dec. 2000, No. 440152, "Flux guide/tunnel valve structure with conducting contiguous junction".

* cited by examiner

*Primary Examiner*—A. J. Heinz
*Assistant Examiner*—Mark Blouin
(74) *Attorney, Agent, or Firm*—Jeffrey P. Aiello

(57) ABSTRACT

In a lead overlay (LOL) type of read head first and second insulation layers are employed with the first insulation layer being located between a top surface of a first hard bias layer and a first lead layer and the second insulation layer is located between the top surface of a second hard bias layer and a second lead layer for minimizing a shunting of a sense current through the hard bias layers into a read sensor.

7 Claims, 8 Drawing Sheets

LEAD OVERLAY SENSOR WITH IMPROVED CURRENT PATH

CROSS-REFERENCE TO RELATED APPLICATIONS

This application is a continuation of U.S. patent application Ser. No. 10/303,114, filed Nov. 22, 2002.

BACKGROUND OF THE INVENTION

1. Field of the Invention

The present invention relates to a lead overlay sensor with an improved current path and, more particularly, to a read head wherein the shunting of a portion of a sense current through hard bias layers adjacent end portions of the sensor to lead overlay regions of the sensor is substantially prevented so that substantially all of the sense current is conducted to the lead overlay regions by first and second leads.

2. Background Information

The heart of a computer is a magnetic disk drive which includes a rotating magnetic disk, a slider that has write and read heads, a suspension arm and an actuator arm. When the disk is not rotating the actuator arm locates the suspension arm so that the slider is parked on a ramp. When the disk rotates and the slider is positioned by the actuator and suspension arms above the disk, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

An exemplary high performance read head employs a spin valve sensor for sensing the magnetic field signals from the rotating magnetic disk. The sensor includes a nonmagnetic electrically conductive first spacer layer sandwiched between a ferromagnetic pinned layer structure and a ferromagnetic free layer structure. An antiferromagnetic pinning layer typically interfaces the pinned layer structure for pinning a magnetic moment of the pinned layer structure 90E to the air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from the rotating magnetic disk. The quiescent position, which is preferably parallel to the ABS, is the position of the magnetic moment of the free layer structure with the sense current conducted through the sensor in the absence of field signals.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a bottom spin valve sensor or a top spin valve sensor depending upon whether the pinned layer is located near the bottom of the sensor close to the first read gap layer or near the top of the sensor close to the second read gap layer. Spin valve sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel to one another. The AP pinned layers may be pinned in their magnetic orientation by an antiferromagnetic (AFM) layer or may be self-pinned. Spin valve sensors are still further classified as single or dual wherein a single spin valve sensor employs only one pinned layer and a dual spin valve sensor employs two pinned layers with the free layer structure located therebetween.

It is important that the free layer be longitudinally biased parallel to the ABS and parallel to the major planes of the thin film layers of the sensor in order to magnetically stabilize the free layer. This is typically accomplished by first and second hard bias magnetic layers which abut first and second side surfaces of the spin valve sensor. Unfortunately, end portions of the free layer abutting the hard bias layers are over-biased and become very stiff in their response to field signals from the rotating magnetic disk. The stiffened end portions can take up a large portion of the total width of a sub-micron sensor and can significantly reduce the amplitude of the sensor. It should also be understood that a narrow track width is important for promoting the track width density of the read head. The more narrow the track width the greater the number of tracks that can be read per linear inch along a radius of the rotating magnetic disk. This enables an increase in the magnetic storage capacity of the disk drive.

There is a need to reduce the stiffening of the magnetic moment of the free layer when longitudinally biased. This has been accomplished by employing a lead overlay (LOL) scheme wherein first and second leads overlay top surfaces of the first and second hard bias layers thence overlay and are electrically connected to first and second top surface end portions of the sensor, which portions are referred to in the art as first and second lead overlay (LOL) regions. The purpose of this scheme is to render the first and second LOL regions substantially insensitive to field signals from the rotating magnetic disk so that only a central portion of the sensor between the first and second LOL regions is sensitive to such field signals. Unfortunately, because of electrical contact between the first and second lead layers and the first and second hard bias layers, a portion of the sense current is shunted through the first and second hard bias layers to the LOL regions of the sensor. In a typical read head the sheet resistance of the hard bias layers is approximately twenty times the resistance of the lead layers. This means that most of the sense current should be carried by the first and second lead layers to the sensor. However, most sensors have a high resistance cap layer which is located between the first and second leads and the LOL regions of the sensor. A typical cap layer is tantalum (Ta). The cap layer forces a portion of the sense current to go through the first and second hard bias layers to the LOL regions of the sensor. This causes the LOL regions to become partially sensitive to the field signals, which sensitivity causes side reading of tracks adjacent the track that is being read by the central portion of the sensor. Accordingly, the magnetic read width (MRW) of the read head is larger than that desired. The MRW is typically greater than the physical track width (TW) wherein the physical track width is the distance between the first and second lead layers which is also the distance between the first and second LOL regions. There is a strong-felt need to reduce the MRW which, in turn, reduces the aforementioned side reading.

SUMMARY OF THE INVENTION

The present invention channels substantially all of the sense current into the LOL regions of the sensor via the leads so as to decrease the MRW of the read head and thereby decrease side reading. This is accomplished by providing first and second insulation layers with the first insulation layer being located between the top surface of the first hard bias layer and the first lead layer and the second insulation layer being located between the top surface of the second hard bias layer and the second lead layer. Each of the first and second insulation layers is made of a material which has a greater sheet resistance than the material of the first and second hard bias layers. Exemplary materials for the first and second insulation layers are tantalum oxide or aluminum oxide.

Another aspect of the invention is to provide a method for reducing the resistance of the first and second leads in the present invention. This has been accomplished by annealing the read head after forming the first and second lead layers. The annealing is preferably implemented after forming the insulation stack of the write head so that the hard baking of the insulation stack, which is typically 240° C. for 2 hours, also anneals the read head to reduce the resistivity of the first and second leads.

Another embodiment of the invention still further reduces shunting of the sense current through the first and second hard bias layers to the LOL regions of the sensor. This is accomplished by employing third and fourth insulation layers wherein the third insulation layer is located between the end surface of the first hard bias layer and the first side surface of the sensor and the fourth insulation layer is located between the end surface of the second hard bias layer and the second side surface of the sensor. Again, the third and fourth insulation layers are constructed of a material which has a greater sheet resistance than the material of the first and second hard bias layers. The third and fourth insulation layers insulate the first and second hard bias layers from the LOL layers while the first and second insulation layers insulate the first and second lead layers from the hard bias layers.

Important aspects of the invention will be appreciated upon reading the following description taken together with the accompanying drawings, wherein the figures in the drawings are not to scale with respect to the articles represented therein nor with respect to each another on the processor is provided to the server, they can verify that the response from the server.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Magnetic Disk Drive

Figure 1:
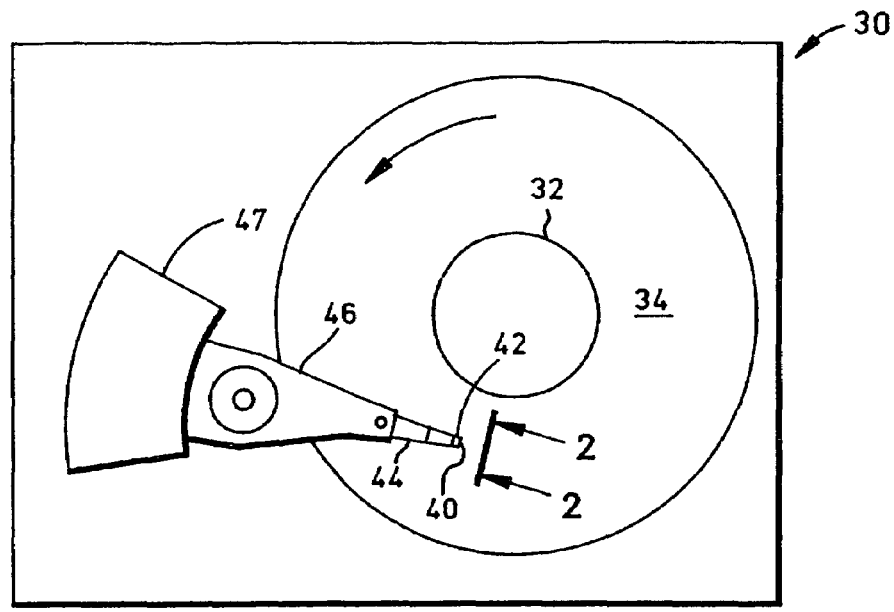
FIG. 1 is a plan view of an exemplary prior art magnetic disk drive.
Figure 2:
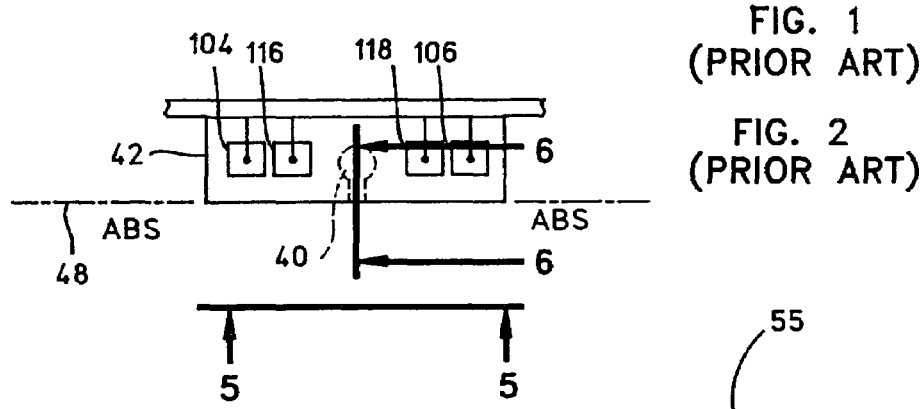
FIG. 2 is an end view of a slider with a magnetic head of the disk drive as seen in plane 2-2 of FIG. 1.
Figure 3:
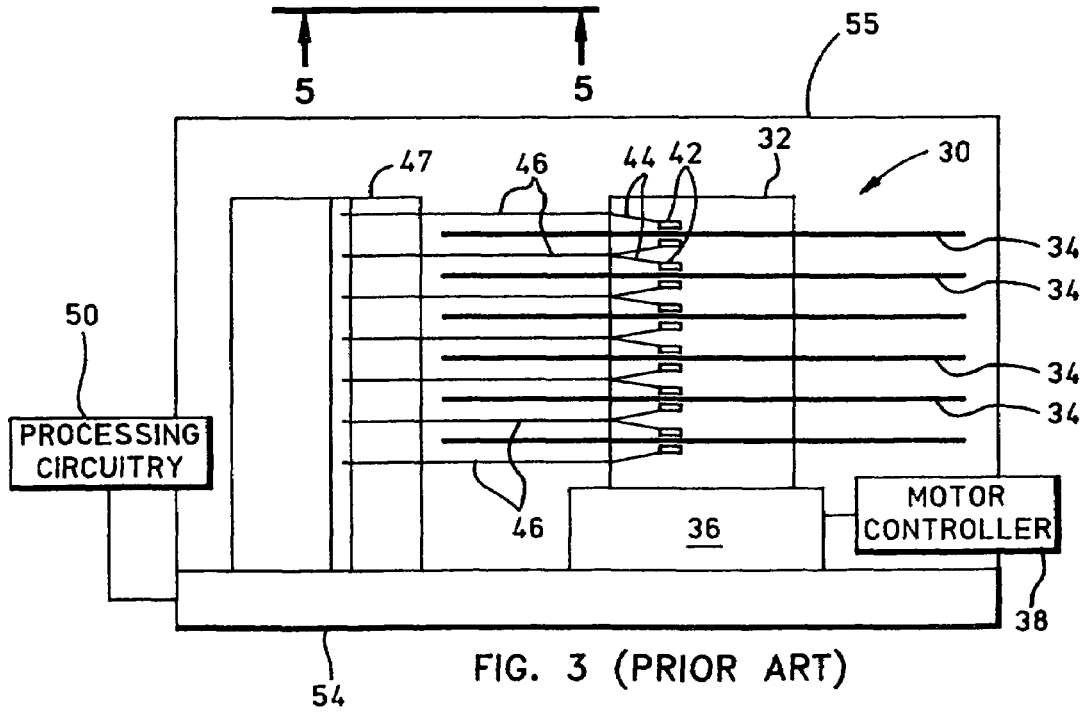
FIG. 3 is an elevation view of the magnetic disk drive wherein multiple disks and magnetic heads are employed.
Figure 4:
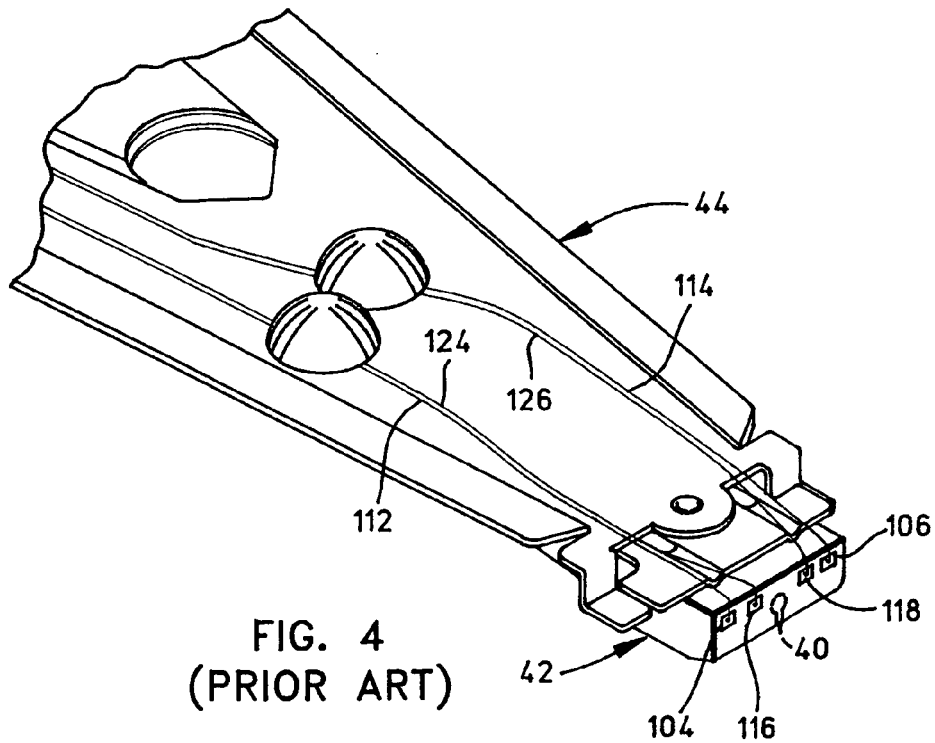
FIG. 4 is an isometric illustration of an exemplary prior art suspension system for supporting the slider and magnetic head.

Referring now to the drawings wherein like reference numerals designate like or similar parts throughout the several views, FIGS. 1-3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head assembly 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head assembly 40 is in a transducing relationship with a surface of the magnetic disk 34. When the disk 34 is rotated by the spindle motor 36 the slider is supported on a thin (typically, 0.01 µm) cushion of air (air bearing) between the surface of the disk 34 and the air bearing surface (ABS) 48. The magnetic head assembly 40 may then be employed for writing information to multiple circular tracks on the surface of the disk 34, as well as for reading information therefrom. Processing circuitry 50 exchanges signals, representing such information, with the head assembly 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
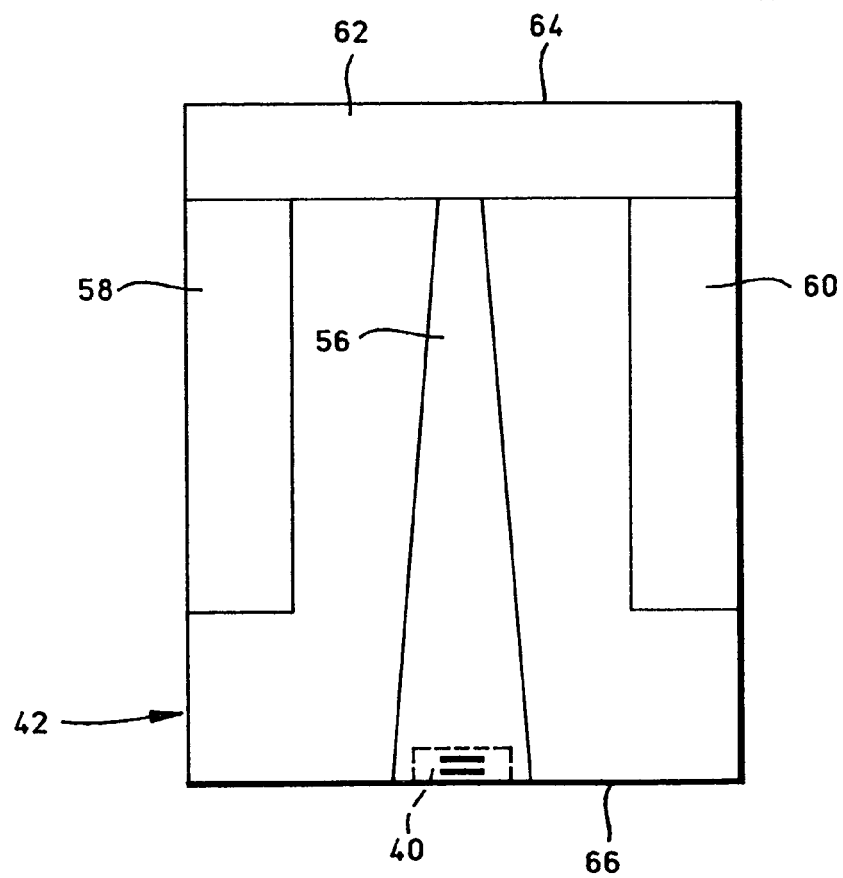
FIG. 5 is an ABS view of the magnetic head taken along plane 5-5 of FIG. 2.

FIG. 5 is an ABS view of the slider 42 and the magnetic head assembly 40. The slider has a center rail 56 that supports the magnetic head assembly 40, and side rails 58 and 60. The rails 56, 58 and 60 extend from a cross rail 62. With respect to rotation of the magnetic disk 34, the cross rail 62 is at a leading edge 64 of the slider and the magnetic head assembly 40 is at a trailing edge 66 of the slider.

Figure 6:
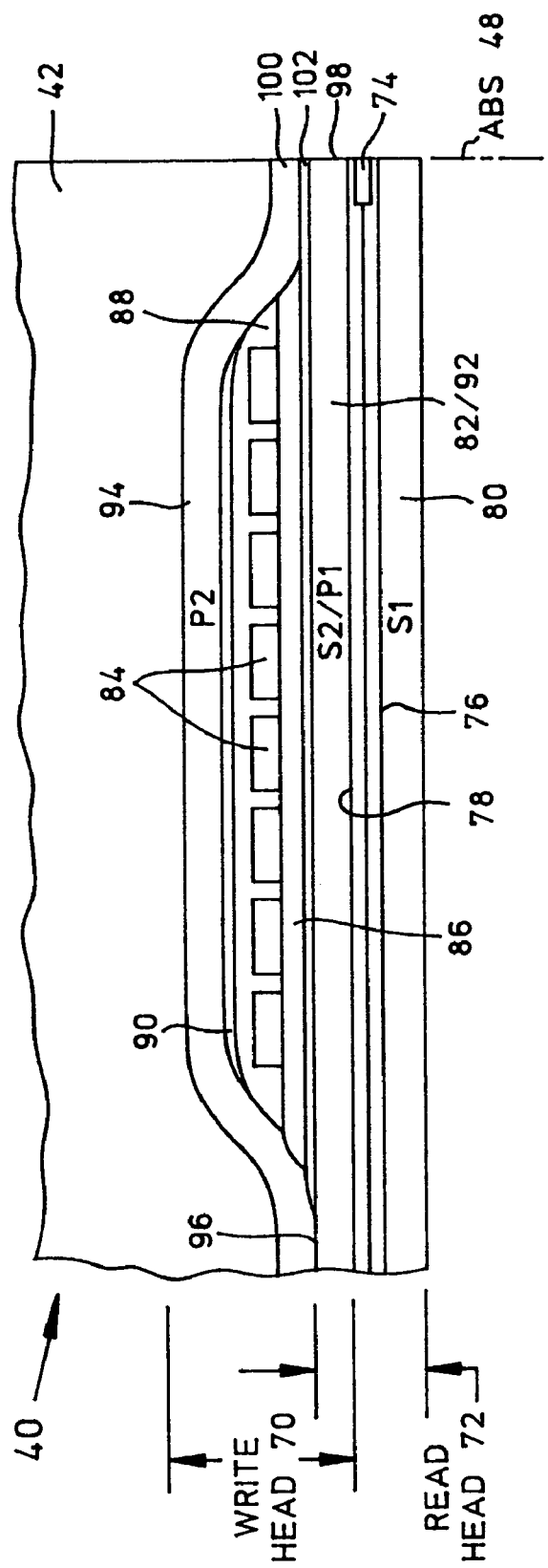
FIG. 6 is a partial view of the slider and a merged magnetic head as seen in plane 6-6 of FIG. 2.
Figure 7:
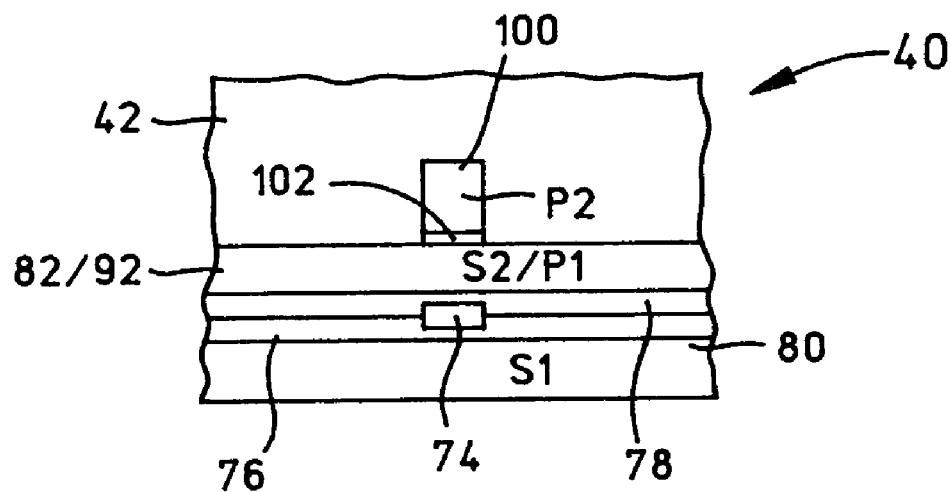
FIG. 7 is a partial ABS view of the slider taken along plane 7-7 of FIG. 6 to show the read and write elements of the merged magnetic head.

FIG. 6 is a side cross-sectional elevation view of a merged magnetic head assembly 40, which includes a write head portion 70 and a read head portion 72 wherein the read head employs a spin valve sensor 74. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current IS conducted through the sensor causes these resistance changes to be manifested as potential changes. These potential changes are then processed as readback signals by the processing circuitry 50 shown in FIG. 3.

Figure 8:
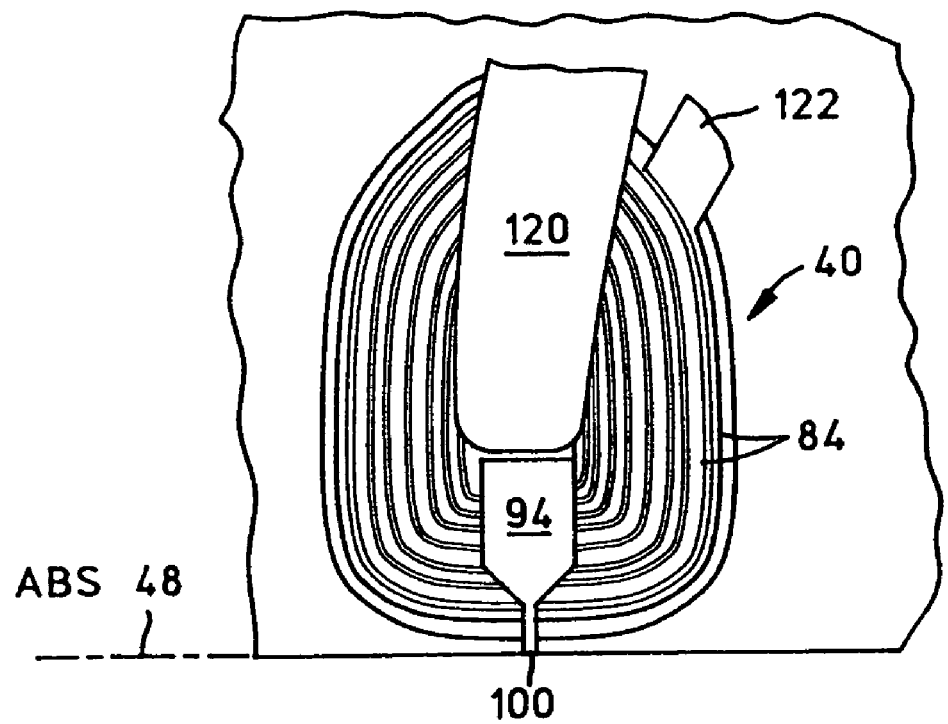
FIG. 8 is a view taken along plane 8-8 of FIG. 6 with all material above the coil layer and leads removed.

The write head portion 70 of the magnetic head assembly 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads (not shown) from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
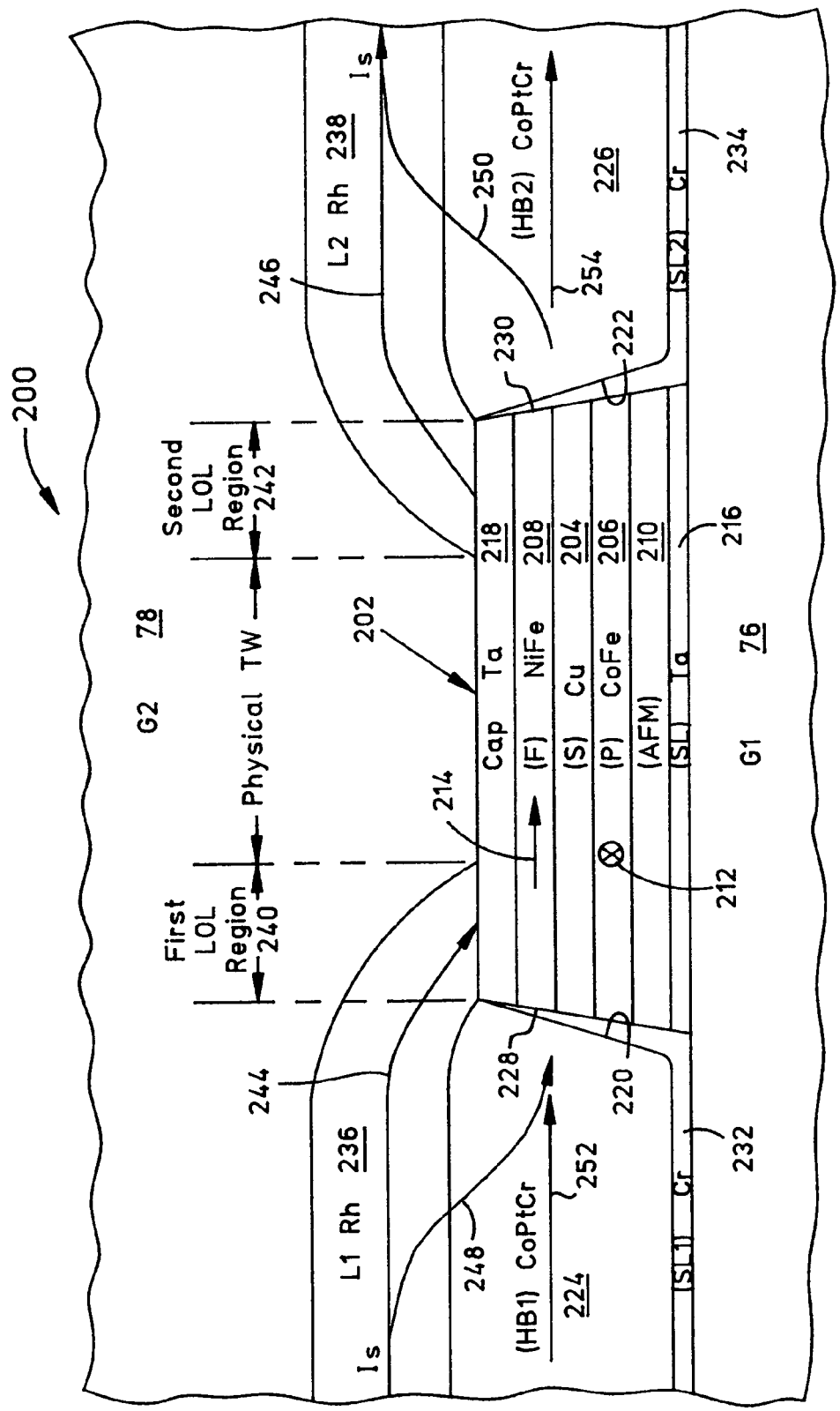
FIG. 9 is an enlarged isometric ABS illustration of the read head and sensor with a prior art lead overlay (LOL) scheme.

FIG. 9 is an ABS illustration of a partial read head 200 wherein an exemplary spin valve sensor 202 is located between the first and second read gap layers (G1) and (G2) 76 and 78. The sensor 202 includes an electrically conductive spacer layer (S) 204 which is located between and interfaces a ferromagnetic pinned layer (P) 206 and a ferromagnetic free layer (F) 208. An antiferromagnetic pinning layer (AFM) 210 may be exchange coupled to the pinned layer 206 for pinning a magnetic moment 212 of the pinned layer perpendicular to the ABS in a direction either out of the sensor or into the sensor shown in FIG. 9. The free layer 208 has a magnetic moment 214 which is parallel to the ABS in a direction either from right to left or from left to right, as shown in FIG. 9. When a field signal from the rotating magnetic disk rotates the magnetic moment 214 of the free layer into the sensor the magnetic moments 214 and 212 become more parallel which reduces the resistance of the sensor to the sense current IS and when the field signals from the rotating magnetic disk rotate the magnetic moment 214 out of the sensor the magnetic moments 214 and 212 become more antiparallel which increases the resistance of the sensor to the sense current IS. These resistance changes result in potential changes in the sense current circuit which are processed as playback signals by the processing circuitry 50 in FIG. 3. A seed layer (SL) 216 may be located between the first read gap layer 76 and the pinning layer 210 for improving the texture of the layers deposited thereon. A cap layer 218 is located on top of the free layer 208 for protecting the sensor from subsequent processing steps. The cap layer, which is typically a high resistance material, causes a problem in the lead overlay (LOL) scheme, which will be described in more detail hereinbelow. Typical materials for the layers of the spin valve sensor are shown in FIG. 9.

End surfaces 220 and 222 of first and second hard bias layers (HB1) and (HB2) 224 and 226 are adjacent first and second side surfaces 228 and 230 of the sensor respectively for longitudinally biasing the free layer 208. In the longitudinal biasing scheme a field between the first and second hard bias layers 224 and 226 extends through the free layer 208 to stabilize the free layer in a single magnetic domain state so that domain walls and their movements to different positions while reading is obviated. Unfortunately, the field from the first and second hard bias layers is too strong in end regions of the sensor which causes a stiffening of these end regions in their response to field signals from the rotating magnetic disk, which problem will be discussed in more detail hereinafter. First and second seed layers (SL1) and (SL2) 232 and 234 are located between the first read gap layer 76 and the first and second hard bias layers 224 and 226 respectively for improving the texture of the hard bias layers deposited thereon. Typical materials for the first and second hard bias layers 224 and 226 and the first and second seed layers 232 and 234 are shown in FIG. 9.

In order to reduce the effect of stiffening of the end portions of the sensor 202, first and second lead layers (L1) and (L2) 236 and 238 overlay and make electrical contact with the first and second end regions of the sensor which are designated as first and second lead overlay (LOL) regions 240 and 242. The sense current IS is conducted through the sensor 202 by the first and second leads 236 and 238. A majority of the sense current is conducted through the sensor by first and second paths 244 and 246, however, a portion of the sense current IS is conducted through the sensor via paths 248, 250, 252 and 254. This is an undesirable shunting of the sense current which is conducted to the first and second LOL regions 240 and 242 because of an electrical connection between the lead layers and the hard bias layers. This electrical connection is caused by the first and second lead layers 236 and 238 overlaying and contacting the top surfaces of the first and second hard bias layers 224 and 226.

The shunting problem is exacerbated by the typically high resistance cap layer 218 which shunts more of the sense current along the paths 248, 250, 252 and 254. Shunting of the sense current along paths 248, 250, 252 and 254 into the first and second LOL regions 240 and 242 increases the sensitivity of the LOL regions which increases the magnetic read width (MRW) of the read head and causes side reading of tracks adjacent to the track which is being read by a central portion of the sensor which is designated as physical track width (TW). The magnetic read width (MRW) depends upon many factors and is typically greater than the physical track width. The sense current shunting along paths 248, 250, 252 and 254 results in an unacceptable increase in the MRW and an unacceptable increase in side reading.

The Invention

Figure 10:
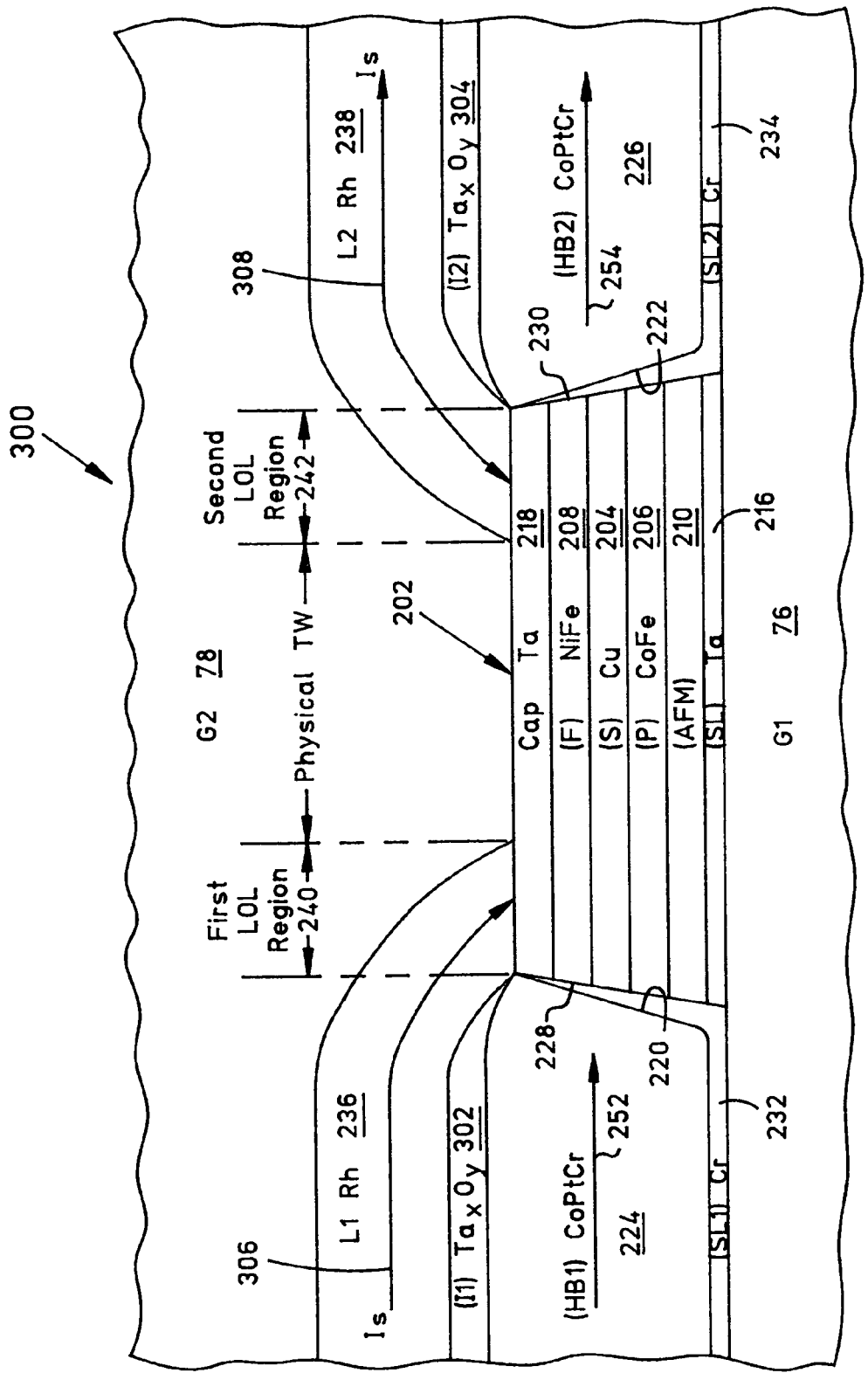
FIG. 10 is an ABS view of the read head with one embodiment of the present LOL scheme.

A partial read head 300 is illustrated in FIG. 10 which exemplifies a first embodiment of the present invention. The partial read head 300 in FIG. 10 is the same as the partial read head in FIG. 9 except for first and second insulation layers (I1) and (I2) 302 and 304 wherein the first insulation layer 302 is located between the first hard bias layer 224 and the first lead layer 236 and the second insulation layer 304 is located between the second hard bias layer 226 and the second lead layer 238. The material of the first and second insulation layers 302 and 304 has a sheet resistance which is greater than the sheet resistances of the material of the first and second hard bias layers 224 and 226 and the material of the first and second lead layers 236 and 238. The sense current shunt paths 248 and 250 in FIG. 9 are absent from FIG. 10 because the first and second insulation layers 302 and 304 substantially prevent any of the sense current from being conducted from the first and second lead layers 236 and 238 into the first and second hard bias layers 224 and 226. Accordingly, the sense current paths 306 and 308 conduct more of the sense current into the first and second LOL regions 240 and 242 than the sense current paths 244 and 246 in FIG. 9. The embodiment of the invention shown in FIG. 10 forces more of the sense current through the cap layer 218 into the sensor so that the read sensitivity of the first and second LOL regions 240 and 242 is reduced. This reduces the aforementioned MRW and decreases side reading by the read head. This will reduce the width of erase bands on each of the track being read so that more tracks can be read per linear inch along a radius of the rotating magnetic disk. This increases the magnetic storage capacity of a magnetic disk drive. However, some of the sense current is still shunted along paths 252 and 254.

Figure 11:
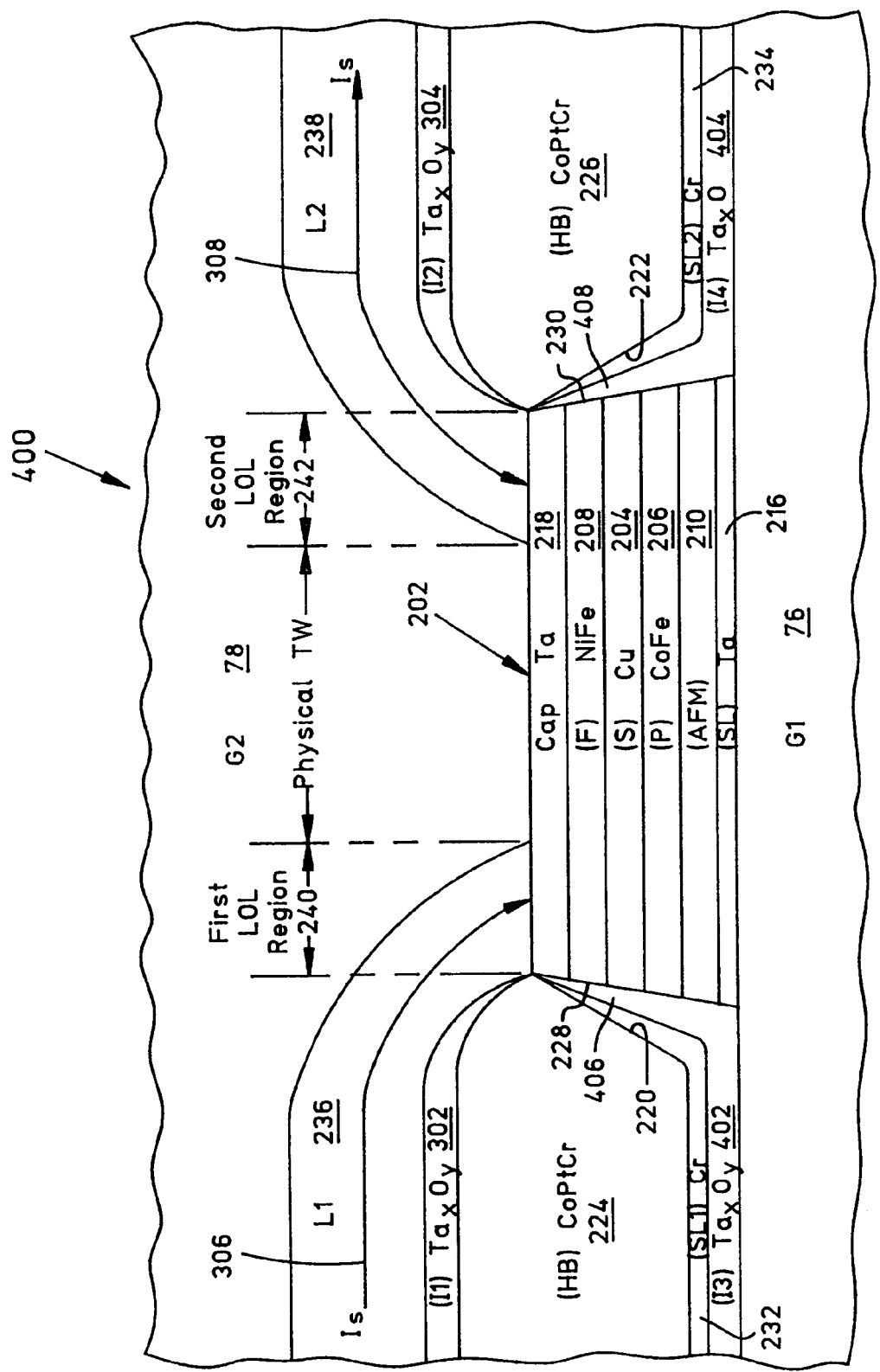
FIG. 11 is an ABS view of the read head with another embodiment of the present LOL scheme.

FIG. 11 is an enlarged ABS view of a partial read head which incorporates a second embodiment of the present invention. The partial read head 400 in FIG. 11 is the same as the partial read head 300 in FIG. 10 except for third and fourth insulation layers (I3) and (I4) 402 and 404 which are formed on the first read gap layer 76 with the first seed layer 232 located between the third insulation layer 402 and the first hard bias layer 224 and the second seed layer 234 located between the fourth insulation layer 404 and the second hard bias layer 226. The formation of the third and fourth insulation layers 402 and 404 is typically by sputter deposition which causes the third and fourth insulation layers to have sloping layer portions 406 and 408 on the first and second side surfaces 228 and 230 in the same manner as the sloping portions of the first and second seed layers 232 and 234, wherein the sloping portion of the first seed layer 232 is located between the sloping surface 406 of the third insulation layer and the first hard bias layer 224 and the sloping surface of the second seed layer 234 is located between the sloping surface 408 of the fourth insulation layer and the second hard bias layer 226. Accordingly, the sloping portions 406 and 408 provide further insulation to prevent shunting of the sense current along the paths 252 and 254 in FIG. 10. Again, the material of the third and fourth insulation layers 402 and 404 has a sheet resistance which is higher than the sheet resistance of the materials of the hard bias layers 224 and 226 and the first and second lead layers 236 and 238.

Preferred materials for the first and second insulation layers 302 and 304 and the third and fourth insulation layers 402 and 404 are tantalum oxide (TaxOy) and aluminum oxide (AlxOy). TaxOy may be TaO2 or Al2O3. Preferred materials for the first and second lead layers 236 and 238 are rhodium (Rh) or copper (Cu).

EXAMPLES

We have found that the resistivity of the first and second leads 236 and 238 in the embodiment in FIG. 10 was about 25% higher than the first and second leads 236 and 238 in FIG. 9. However, we have discovered a method for reducing the resistance of the lead layers 236 and 238 in FIG. 10 so as to enhance the advantages of the present invention. In the following examples, which are results of tests performed, Example 1 is without the first and second insulation layers 302 and 304 in FIG. 10 and Examples 2 and 3 include the first and second insulation layers 302 and 304 in FIG. 10 with different thicknesses. In the examples the materials shown in FIGS. 9 and 10 were employed.

Example 1

In this example, the structure shown in FIG. 9 was constructed. Before any annealing, the resistance in ohms/sq. of the first and second lead layers 236 and 238 was 1.07. Next, the read head was annealed at 240° C. for a period of 2 hours which resulted in the resistance of the first and second lead layers 236 and 238 being lowered to 1.01. This annealing was accomplished by a hard bake of the insulation stack (layers 86, 88 and 90 in FIG. 6) after which the second pole piece 94 is formed. This is a preferred step since the hard baking of the insulation stack also anneals the layers of the read head to reduce the resistance of the first and second lead layers 236 and 238.

Example 2

A read head with the scheme shown in FIG. 10 was constructed wherein each of the first and second insulation layers 302 and 304 had a thickness of 50 Å. The sheet resistance of the first and second lead layers 236 and 238 was 1.29 ohms/sq. before annealing and 1.06 ohms/sq. after the aforementioned annealing.

Example 3

Another read head was constructed with the scheme shown in FIG. 10 wherein each of the first and second insulation layers 302 and 304 had a thickness of 100 Å. The sheet resistance R of the first and second lead layers 236 and 238 before annealing was 1.27 ohms/sq. and the sheet resistance R after the aforementioned annealing was 1.05 ohms/sq.

Figure 12:
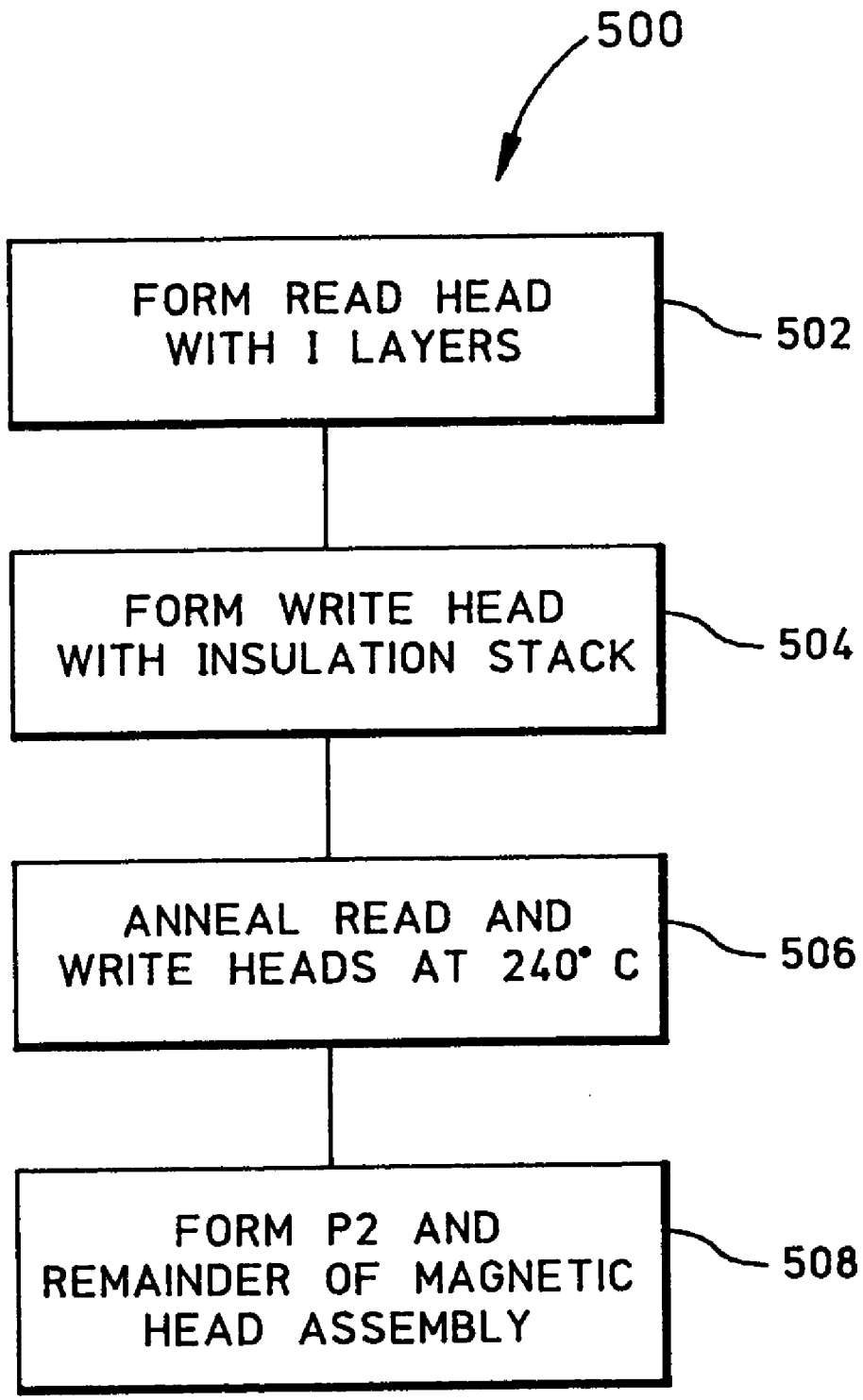
FIG. 12 is a block diagram of exemplary steps of making a head assembly with the present invention.

It can be seen that the annealing in Examples 2 and 3 reduce the resistivity of the lead layers 236 and 238 within 5% of the first and second lead layers 236 and 238 in FIG. 9. Accordingly, the invention includes a method 500, as shown in FIG. 12, wherein in block 502 a read head is formed with the first and second insulation layers 302 and 304 in FIG. 10, in block 504 a partial write head is formed with the insulation stack (layers 86, 88 and 90 in FIG. 6), in block 506 the insulation stack is hard baked at 240° C. for 2 hours which anneals the layers of the read head and in block 508 the second pole piece layer (P2) 94 in FIG. 6 is formed along with a remainder of the magnetic head assembly.

Discussion

While the spin valve sensor 202 is a bottom spin valve sensor, it should be understood that the sensor can be a top spin valve sensor without departing from the spirit of the invention. Further, the pinned layer 206 may be an AP pinned layer and may be self-pinned without the assistance of the pinning layer 210. Further, while the description refers to the head surface as being an air bearing surface (ABS) it should be understood that the head assembly may be employed in a tape drive wherein the head surface faces a moving magnetic medium. The art provides many different materials for the layers which may be employed without departing from the spirit of the invention provided the relative resistivities of the layers described hereinabove are employed. Further, the method of annealing applies equally as well to the scheme shown in FIG. 11 as it does to the scheme shown in FIG. 10.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A magnetic read head assembly comprising:
    a read sensor;
    first and second hard bias layers adjacent to either side of the sensor for longitudinally magnetically biasing the sensor;
    first and second leads overlaying the first and second hard bias layers and electrically connected to the sensor; and
    first and second insulation layers for preventing at least a portion of a sense current conducted by the leads from being conducted into the first and second hard bias layers for reducing the read sensitivity of the read sensor, the first insulation layer interposed between the hard bias layer and the first lead layer and the second insulation layer interposed between the second hard bias layer and the second lead layer; and
    third and fourth insulation layers, the third and fourth insulation layers having sloping layer portions on sides of the sensor, the sloping layer portions interposed between the sides of the sensor and the hard bias layers for preventing conduction of at least a portion of the sense current shunt into the first and second hard bias layers through the sensor for reducing the read sensitivity of the read sensor.

2. The magnetic read head assembly of claim 1 wherein the first and second insulation layers are comprised of a material having a greater electrical resistivity than a material of the first and second hard bias layers.

3. The magnetic read head assembly of claim 2 wherein the third and fourth insulation layers are comprised of a material having a greater electrical resistivity than the material of the first and second hard bias layers.

4. The magnetic read head assembly of claim 3 wherein the insulation layers are comprised of a material selected from the group consisting of tantalum oxide (TaxOx) and aluminum oxide (AlxOx) and wherein the material of the first and second hard bias layers is selected from the group consisting of cobalt platinum chromium (CoPtCr) and CoPt.

5. A method of fabricating a magnetic read head assembly comprising the following steps:
    forming a read sensor;
    forming first and second insulation layers adjacent to either side of the sensor, the first and second insulation layers having sloping layer portions on the sides of the sensor;
    forming first and second hard bias layers adjacent to the first and second insulation layers such that the first and second insulation layers are interposed between either side of the sensor the first and second hard bias layers;
    forming third and fourth insulation layers on the first and second hard bias layers; and
    forming first and second leads that overlay the third and fourth insulation layers and electrically connect to the sensor,
    wherein the sloping layer portions of the first and second insulation layers are interposed between the sides of the read sensor and the hard bias layers for preventing at least a portion of a sense current conducted by the leads and shunt into the first and second hard bias layers from being conducted through the sensor and the third and fourth insulation layers preventing at least a portion of the sense current conducted by the leads from being conducted into the first and second hard bias layers for reducing the read sensitivity of the read sensor.

6. The method of claim 5 wherein the insulation layers are comprised of a material having a greater electrical resistivity than the material of the first and second hard bias layers.

7. The method of claim 6 wherein the material of the insulation layers is selected from the group consisting of tantalum oxide (TaxOx) and aluminum oxide (AlxOx) and wherein the material of the first and second hard bias layers is selected from the group consisting of cobalt platinum chromium (CoPtCr) and CoPt.

* * * * *